US00RE39236E

(19) United States
(12) Reissued Patent
Imamura

(10) Patent Number: US RE39,236 E
(45) Date of Reissued Patent: Aug. 15, 2006

(54) FLAT PANEL DEVICE AND DISPLAY DRIVER WITH ON/OFF POWER CONTROLLER USED TO PREVENT DAMAGE TO THE LCD

(75) Inventor: Youichi Imamura, Suwa (JP)

(73) Assignee: Seiko Epson Corporation, Tokyo (JP)

(21) Appl. No.: 09/854,349

(22) Filed: May 11, 2001

Related U.S. Patent Documents

Reissue of:
(64) Patent No.: 5,903,260
Issued: May 11, 1999
Appl. No.: 08/582,771
Filed: Jan. 2, 1996

U.S. Applications:
(62) Division of application No. 08/267,103, filed on Jun. 23, 1994, now Pat. No. 5,563,624, which is a continuation of application No. 07/834,295, filed on Apr. 9, 1992, now abandoned.

(30) Foreign Application Priority Data

Jun. 18, 1990 (JP) ..... 159416/90
Jun. 11, 1991 (WO) ..... PCT/JP91/00785

(51) Int. Cl.
*G09G 5/00* (2006.01)
*G05B 11/01* (2006.01)

(52) U.S. Cl. ..... 345/211; 700/12
(58) Field of Classification Search ..... 345/204, 345/210, 211, 212, 213, 87, 60, 618; 713/322, 713/330, 340; 700/11, 12
See application file for complete search history.

(56) References Cited

U.S. PATENT DOCUMENTS 3,947,811 A * 3/1976 Hodgson ..... 345/117
4,268,827 A * 5/1981 Hughen et al. ..... 345/117
4,314,245 A * 2/1982 Wilbur, Jr. ..... 345/204
4,453,208 A * 6/1984 Middleton et al. ..... 364/140

(Continued)

FOREIGN PATENT DOCUMENTS

EP 162 969 * 12/1985
EP 0 162 969 12/1985
EP 326 158 * 8/1989
EP 0 326 158 8/1989

(Continued)

OTHER PUBLICATIONS

Proceeding of the SID. vol. 30 (1989) No. 2, New York, Peripheral Circuit Integrated Poly–Si TFT LCD With Gray Scale Representation, Jun–ichi Ohwada, et al., pp. 131–136.

*Primary Examiner*—Chanh Nguyen
(74) *Attorney, Agent, or Firm*—Mark P. Watson

(57) ABSTRACT

Signal management control units $\mathbf{47}_1$–$\mathbf{47}_n$ of respective scan drivers LSI in an LCD module are cascade-connected and each have the same construction. A detected signal of the signal management control unit 47J is a data signal latch clock LP applied to a terminal $CKB_1$. A detected signal of the signal management control unit $\mathbf{47}_2$ is a frame start signal SP applied to a terminal $CKB_2$. A detected signal of the signal management control unit 47n is an AC-transforming clock FR applied to a terminal CKBn. The signal management control unit $\mathbf{47}_1$ includes a signal stop detection circuit 48 serving as a signal detection means for detecting a stop of the detected signal and a sequence processing circuit 51 consisting of a signal delay circuit 49 and a logic circuit 50. When stopping oscillations of, e. g., the frame start signal SP, outputs $T_1$–$T_n$ of the circuit 51 change to an L level. Hence, a display-off signal DF of the LCD module assumes the L level. A liquid crystal panel is forcibly set in a display-off mode. As a result, even if the frame start signal SP is stopped due to some cause, a liquid crystal application voltage is set down to zero. It is, therefore, possible to avoid a liquid crystal DC drive and prevent a deterioration of the liquid crystal.

2 Claims, 9 Drawing Sheets

U.S. PATENT DOCUMENTS

| | | | | | |
|---|---|---|---|---|---|
| 4,541,066 | A | * | 9/1985 | Lewandowski | 345/117 |
| 4,674,031 | A | * | 6/1987 | Siska, Jr. | 364/141 |
| 4,687,956 | A | * | 8/1987 | Itoh et al. | 345/102 |
| 4,748,444 | A | * | 5/1988 | Arai | 345/213 |
| 4,758,896 | A | * | 7/1988 | Ito | 345/204 |
| 4,855,892 | A | * | 8/1989 | Lower | 363/86 |
| 4,922,448 | A | * | 5/1990 | Kunieda et al. | 345/1 |
| 4,931,791 | A | * | 6/1990 | Mallard, Jr. | 340/825.5 |
| 5,077,553 | A | * | 12/1991 | Buzak | 345/87 |
| 5,155,477 | A | * | 10/1992 | Shirochi | 345/204 |
| 5,155,613 | A | * | 10/1992 | Sakayori | 345/97 |
| 5,592,191 | A | * | 1/1997 | Tsuboyama et al. | 345/97 |
| 5,629,715 | A | * | 5/1997 | Zenda | 345/3 |
| 5,710,929 | A | * | 1/1998 | Fung | 395/750.04 |
| 5,903,260 | A | | 5/1999 | Imamura | 345/211 |
| 5,952,990 | A | * | 9/1999 | Inoue et al. | 345/214 |

FOREIGN PATENT DOCUMENTS

| | | | |
|---|---|---|---|
| EP | 419 910 | * | 4/1991 |
| EP | 0 419 910 | | 4/1991 |
| JP | 49 97593 | | 9/1974 |
| JP | 49-97593 | * | 9/1974 |
| JP | 100997 | * | 8/1977 |
| JP | 52-100997 | | 8/1977 |
| JP | 128178 | * | 10/1977 |
| JP | 52 128178 | | 10/1977 |
| JP | 55-117190 | * | 9/1980 |
| JP | 123118 | * | 7/1983 |
| JP | 58-123118 | | 7/1983 |
| JP | 61 50195 | * | 3/1986 |
| JP | 61-50195 | | 3/1986 |
| JP | 03-153294 | | 7/1991 |
| JP | 03-202812 | | 9/1991 |

* cited by examiner

A: LIQUID CRYSTAL DRIVE INHIBIT PERIOD
B: LIQUID CRYSTAL DRIVE PERIOD
C: DISPLAY-OFF PERIOD

FLAT PANEL DEVICE AND DISPLAY DRIVER WITH ON/OFF POWER CONTROLLER USED TO PREVENT DAMAGE TO THE LCD

Matter enclosed in heavy brackets [ ] appears in the original patent but forms no part of this reissue specification; matter printed in italics indicates the additions made by reissue.

This is a Divisional of prior application Ser. No. 08/267,103 filed on Jun. 23, 1994 now U.S. Pat. No. 5,563,624 which is a continuation of Ser. No. 07/834,295 filed on Apr. 9, 1992 which is now abandoned, which is a 371 of PCT Internatonal Application No. PCT/JP91/00785, filed Jun. 11, 1991, and which designated the U.S.

*STATEMENT OF RELATED APPLICATIONS*

*This reissue application is related to divisional reissue application Ser. No. 10/677,165 filed Oct. 1, 2003, which is a reissue application of U.S. Pat. No. 5,903,260.*

BACKGROUND OF THE INVENTION

1. Technical Field

The present invention relates generally to a flat display such as liquid crystal display (LCD) and plasma display panels and also applied devices thereof, and more particularly, to a flat display device having such a configuration that a display body module and a display control unit for controlling the display are separately disposed as well as to a display body driving device.

2. Background Art

A portable personal computer and word processor known as a so-called laptop type generally have hitherto incorporated an opening/closing type flat display unit. Middle-and-large-sized liquid crystal display devices mounted therein each consist of, as illustrated in FIG. 9, a liquid crystal display unit 10 built into the device body and a flat liquid crystal display module unit 20 provided inwardly of an opening/closing cover so that these units are separately independently disposed. The liquid crystal display control unit 10 includes a liquid crystal module controller 12 and a microprocessor unit (MPU), not shown. The liquid crystal module controller 12 supplies a variety of control signals and clock signals to liquid crystal display module unit 20. The liquid crystal display module unit 20 has:, e. g., a simple matrix type liquid crystal display panel (matrix liquid crystal display elements) 22; a signal electrode driving circuit (X drivers) 24 and a scan electrode driving circuit (Y drivers) 26 which are TAB-packaged in peripheral regions (frame) of the panel 22; and a liquid crystal power source circuit 28 for generating high liquid crystal driving voltages (reference voltages) $V_0$–$V_5$. Signal electrode driving circuit 24 is composed of a plurality of signal electrode driver semiconductor integrated circuits $\mathbf{24}_1$–$\mathbf{24}_m$ which are cascade-connected. Signal electrode driving circuit 24 supplies driver outputs per picture line to, e. g., M-pieces of signal electrodes in total. More specifically, data signals D0–D7 are sequentially taken in a shift register within the signal electrode driving circuit 24 by pixel clocks (shift clock pulses) XSCL. When the signals (M bits) per picture line are taken in, the data signals within the shift register are transmitted in parallel to a data latch circuit by scan line synchronous signals (data signal latch clocks LP) YSCL. The data signals undergo series/parallel conversion. The data latch circuit holds a signal voltage per line during a 1-scan period. Based on this signal voltage, a selection switch circuit sets output voltages of drivers connected to the signal electrodes either in a selection state or in a non-selection state. The AC-transforming clock FR is a clock for transforming each voltage described above into an AC waveform in order to prevent a deterioration of the liquid crystal elements due to a DC drive. A forced blank display signal DF is conceived as a signal for forcibly bringing a liquid crystal picture into a blank display state. The scan electrode driving circuit 26 consists of a plurality of scan electrode driver semiconductor integrated circuits $\mathbf{26}_1$–$\mathbf{26}_n$ which are cascade-connected. The circuit 26 works to give a section voltage to only one of a total of N pieces of scan electrodes and non-selection voltages to the rest of them, i. e., (N −1) pieces of scan electrodes. A 1-scan line period is started by the scan start pulse (frame start signal) SP. Every time a scan line synchronous signal YSCL (data signal latch clock LP) comes, the selection voltages are sequentially impressed on the scan electrodes from the first line electrode to the N-th line electrode (line sequence display). The liquid crystal power source circuit 28 disposed on the side of the liquid crystal display module unit 20 generates a plurality of liquid crystal driving voltages $V_0$–$V_5$ selected by the selection switch of the scan electrode driving circuit 26 and the signal electrode driving circuit 24. The liquid crystal power source circuit 28 is set in power on/off states by the forced blank display signal DF.

The liquid crystal display control unit 10 built in the device body is connected to the flat liquid crystal display module unit 20 typically through a hinge-connected movable part by using a flexible cable 30. With this arrangement, the cable 30 itself is bent every time the opening/closing cover on the side of the flat liquid crystal display module unit 20 is opened and closed. Signal lines of the cable 30 tend to be damaged or disconnected due to physical factors. If a part of the signal lines are disconnected, there arises a situation where no AC drive is effected in such a state that a DC voltage (DC component) remains impressed on, e. g., a liquid crystal display panel 22. Deterioration of the liquid crystal display panel 22 is caused which is more expensive than other parts and therefore difficult to exchange. This liquid crystal deterioration is conceived as a factor of obstacle to display quality and life-span. This is a serious problem to the display device based on visual recognizability. Among the signals supplied to the liquid crystal display module unit 20 from the liquid crystal module controller 12, the signals which may induce a decline of the DC drive of the liquid crystal display panel 22 are a scan start pulse SP, a scan line synchronous signal YSCL (data signal latch clock LP), an AC-transforming clock FR, and a logic-side power source voltage Vcc. When some operational abnormalities occur in the liquid crystal module controller 12 and the microprocessor unit (MPU), abnormalities arise in the respective signals. There exists a possibility where the situation similar to the above-mentioned may take place.

Expanding the problem about the DC drive of the liquid crystal display body, this can be generalized to a problem associated with a signal abnormality on the side of the liquid crystal module unit. Besides, where a wall-mounted TV is presumed, because of a display control unit and a display panel being disposed in remote places, a problem in terms of deterioration in display quality is produced due to attenuation of signal level and the influence of noise as well as signal stoppage. Furthermore, problems also occur not only in liquid crystal displays but also plasma displays.

Accordingly, it is an object of the present invention devised in light of the above-described problems to provide a flat display device and a display body driving device which are capable of preventing deterioration of display characteristics due to a DC drive of a display panel, this deterioration being derived from an abnormality of a signal supplied from a display control unit to a display body module unit.

DISCLOSURE OF THE INVENTION

Generally in a flat display device wherein a display body module unit and a display control unit for controlling the display thereof are separately disposed, the display body module unit performs passive operations while following up control signals given from the display control unit. The present invention, however, adopts an autonomous signal system including a signal management control means. All of the components of the signal management control means can be provided on the side of the display body module unit. Those components may, however, be disposed distributively on the side of the display body module unit and in the display control unit.

Such a signal management control means consists of a signal detection means for detecting an occurrence of abnormality of a first signal transferred from the display control unit and a sequence processing means for changing a signal mode on the side of the display body module unit on the basis of the output thereof. The signal abnormality implies signal stoppage, a shrinkage in logic amplitude and an interference. A typical example may be the signal stopping. A liquid crystal display device and a plasma display device may be exemplified as a flat display device. The signal detection means is composed concretely of a signal stop detection means for detecting a stop of a first signal. The sequence processing means is a forced stop control means for control-setting, to zero, a display body application voltage supplied to a display panel body of a display body driving means on the basis of the output thereof. When the first signal is stopped on the side of the display body module, this stop is detected by the signal stop detection means. The display body driving means is thereby controlled by the forced stop control means. The driving means sets the display body application voltage to zero. Hence, even when stopping the first signal such as a clock or the like, DC drive of the display body of the liquid crystal is avoided, thereby preventing deterioration of the display characteristics.

The following is an adoptable arrangement of the concrete forced stop control means. The forced stop control means includes a first signal delay means for delaying a second signal transferred from the display control unit by an output of the signal stop detection means. Display on/off of the display body driving means is controlled based on the output thereof. With such an arrangement, as a matter of course, the display on the liquid crystal panel can be quickly set in an off-state upon generating the detection signal. When the first signal resumes, however, the action is not that the display-on state is restarted at that moment but that the display body driving means is control-set in a display-on state after a time predetermined based on a cycle of the second signal has elapsed. Such a display body driving means control method, in terms of time difference, is capable of preventing an abnormal drive due to an abnormality of the power source, the abnormality being induced from a rush current. This control method is also capable of reducing a power source load and simplifying a power source circuit. The signal delay means receives a frame start signal as a second signal and is desirably N-staged D-type flip-flops settable and resettable, based on an output of the detection means. A delay time in such a case is determined on the unit of frame period. Another adoptable arrangement is that a plurality of signal management control means are disposed on the side of the liquid crystal module. In this case, it is possible to simultaneously detect plural kinds of signals. The forced stop control means is provided with a third signal control terminal for controlling the output thereof, whereby the plurality of signal management control means can be cascade-connected. In such a case, when any detected signal is stopped, display-off with respect to the display body driving means is controllable.

In order to further prevent deterioration of the display body due to the abnormal drive attributed to the rush current, it is desirable that the display body module be provided with a power source control means for controlling power on/off of a display body power source means for generating display body driving voltages. This power source control means controls power on/off of the display body power source means, corresponding to an output of the detection means. By this control process, after confirming an appearance of the first signal on the side of the display body module unit, the display body power source means is powered on. The following is an adoptable construction of the concrete power source control means. The power source control means includes a second signal delay means for delaying the second signal transferred from the display control unit by the output of the detection means. Based on the output thereof, power on/off of the display body power source means is controlled. With this arrangement, the output of the first signal is confirmed, and, after the time predetermined based on the cycle of the second signal has passed, the display body driving means is energized. For this reason, the power source control means receives an input of a display on/off signal as a second signal.

Where the power source control means is M-staged (<N) D-type flip-flops which are set/reset by an output of the detection means, after energizing the display body power source means, the display body driving means is put into a display-on state. This also contributes a reduction in the rush current. However, M and N are positive integers.

The signal management control means relative to the above-described construction is provided on a glass substrate on the side of the display body module unit. The signal management control means can be incorporated into a circuit of the display body driving device which is packaged on the side of the display body module unit. Namely, a display body driving means incorporating a signal management control function can be actualized. The conventional display body driving means is configured in the form of drivers LSI. The forgoing display body driving means with the signal management control function can be constructed as a semiconductor integrated circuit. Y drivers LSI among the drivers LSI are smaller in the number of I/O wires than X drivers LSI. Taking this fact into consideration, it is advantageous that the Y drivers are employed as the drivers LSI with the signal management control function. Liquid crystal display devices are classified roughly into a simple matrix type and an active matrix type. Drivers LSI with the signal management control function are desirably scan drivers or gate drivers.

BEST MODE FOR CARRYING OUT THE INVENTION

Embodiments of the present invention will hereinafter be described with reference to the accompanying drawings.

(Embodiment 1)

Figure 1:
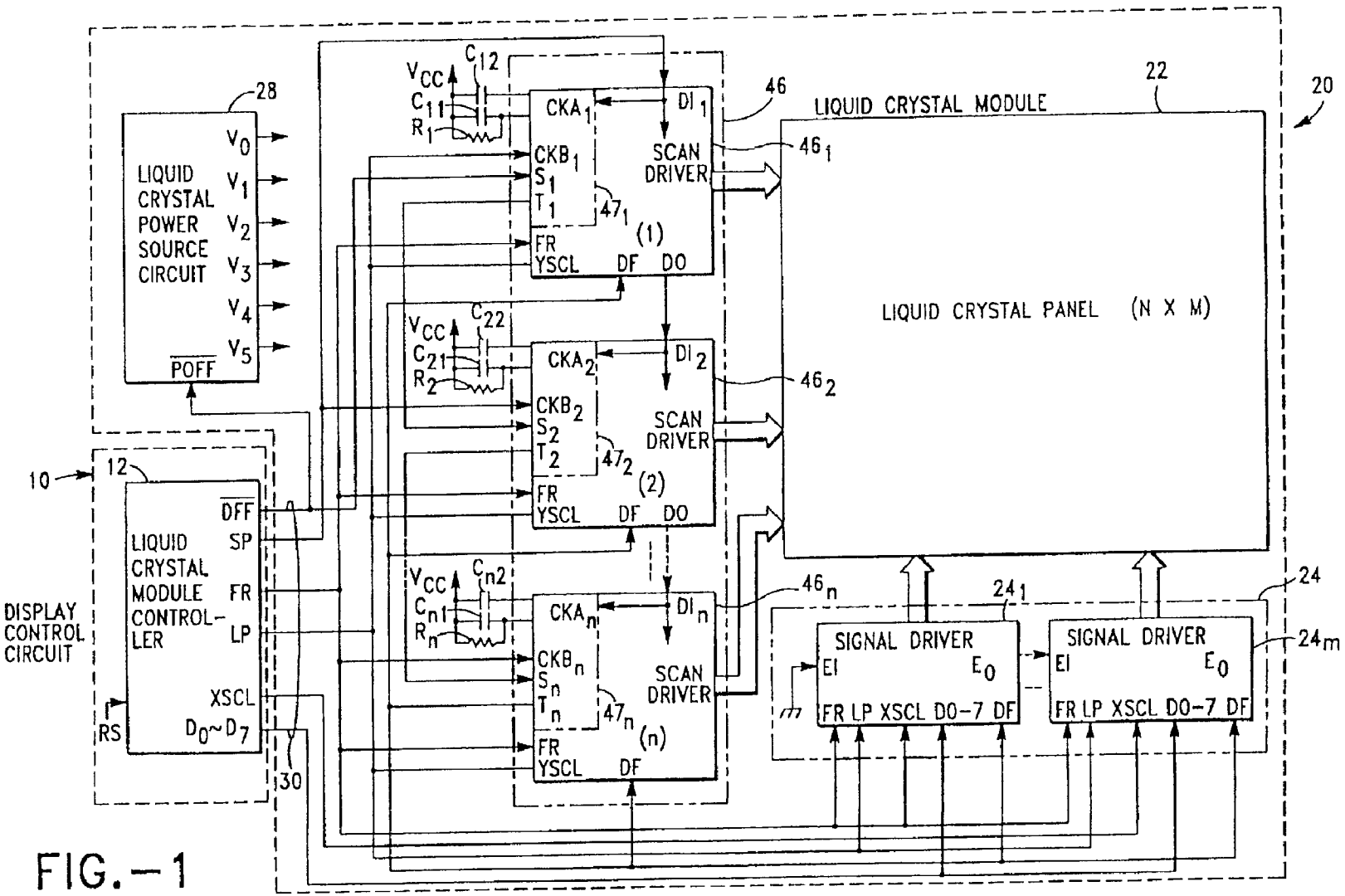
FIG. 1 is a block diagram illustrating a whole configuration of a liquid crystal display device in an embodiment 1 of this embodiment.
Figure 9:
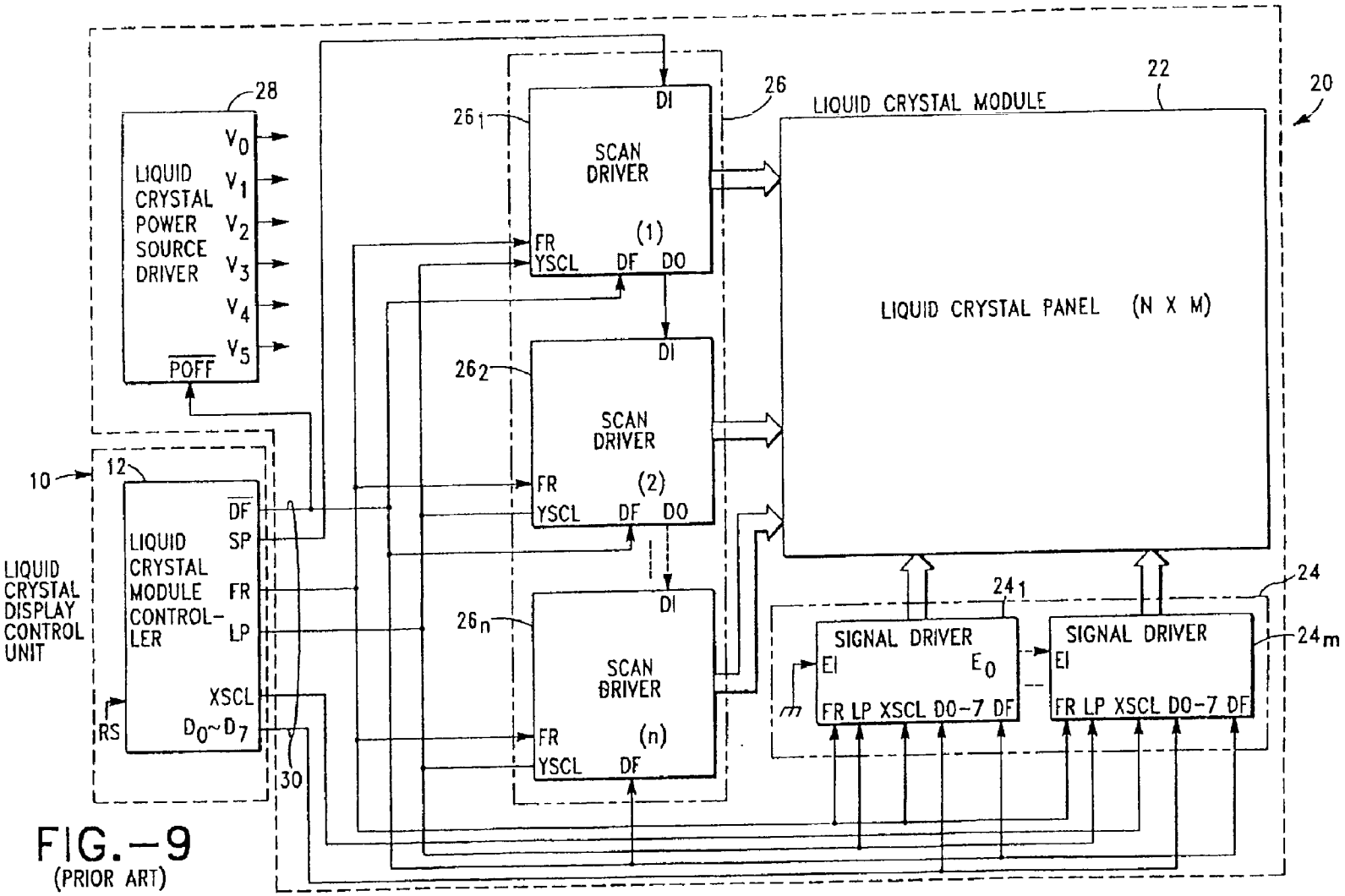
FIG.—9 (PRIOR ART)
FIG. 9 is a block diagram depicting one configuration of a conventional liquid crystal display device.

FIG. 1 is a block diagram illustrating a whole configuration of a liquid crystal display device in an embodiment 1 of this invention. Note that in FIG. 1, the same components as those of FIG. 9 are marked with the like reference symbols, and the description thereof will be omitted.

Signal management control units 47 are incorporated into scan driver semiconductor integrated circuits (LSI) $\mathbf{46}_1$–$\mathbf{46}_n$ combined to constitute a scan electrode driving circuit (Y drivers) of a liquid crystal display module unit 40 in this embodiment. A signal management control unit $\mathbf{47}_1$ of the first scan driver semiconductor integrated circuit $\mathbf{46}_1$ detects stoppage of a scanning line synchronous signal YSCL (data signal latch clock LP) applied to a terminal CKB1. The signal management control unit $\mathbf{47}_2$ of the second scan driver semiconductor integrated circuit $\mathbf{46}_2$ detects stoppage of a scan start pulse (frame start signal) SP applied to a terminal CKB2. A signal management control unit $\mathbf{47}_n$ of the n-th (e.g., third) scan driver semiconductor integrated circuit $\mathbf{46}_n$ detects stoppage of an AC-transforming clock FR applied to a terminal CKBn. The respective signal management control units $\mathbf{47}_1$–$\mathbf{47}_n$ have signal stop detection control terminals $S_1$–$S_n$ and signal stop detection terminals $T_1$–$T_n$. A forced blank display signal DFF of a high level voltage is normally supplied from the control circuit 10 to the signal stop detection control terminal $S_1$ of the signal management control unit $\mathbf{47}_1$ of the first scan driver semiconductor integrated circuit $\mathbf{46}_1$. The signal stop detection terminal $T_1$ is connected to the signal stop detection control terminal $S_2$ of the signal management control unit $\mathbf{47}_2$ of the second scan driver semiconductor integrated circuit $\mathbf{46}_2$. The signal stop detection terminal $T_2$ of the signal management control unit $\mathbf{47}_2$ of the second scan driver semiconductor integrated circuit $\mathbf{46}_2$ is connected to a signal stop detection terminal (e. g., the signal stop detection control terminal $S_n$ of the n-th signal management control unit $\mathbf{47}_n$) of the next stage. The signal stop detection terminal $T_n$ of the n-th signal management control unit 47n is connected to forced blank control terminals DF of the scan drivers $\mathbf{46}_1$–$\mathbf{46}_n$ and the signal drivers $\mathbf{24}_1$–$\mathbf{24}_n$.

Figure 2:
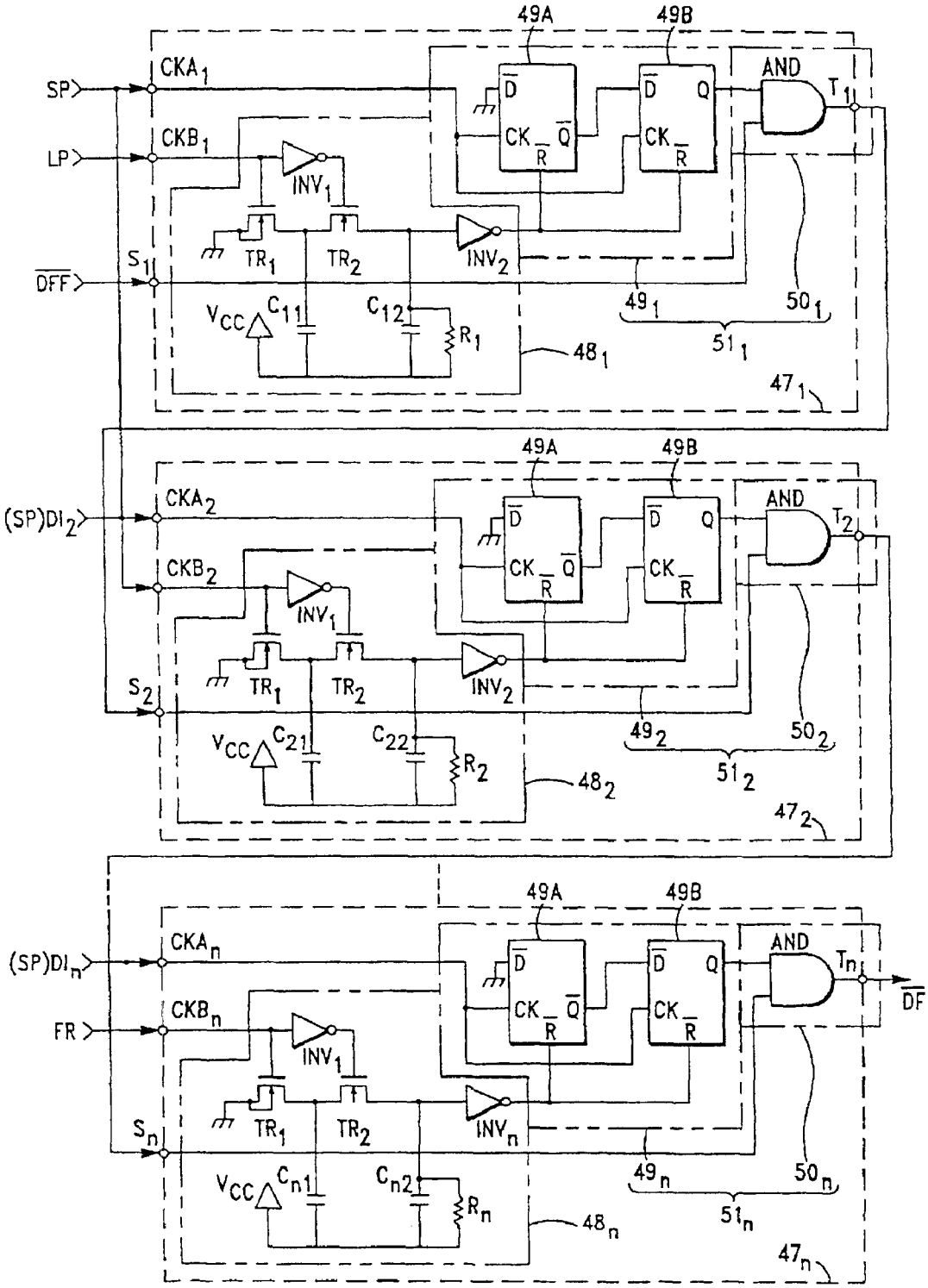
FIG. 2 is a circuit diagram showing constructions of respective scan drivers and connective relations between drivers in the same embodiment.

The signal management control units $\mathbf{47}_1$–$\mathbf{47}_n$ of the respective scan drivers are, as illustrated in FIG. 2, cascade-connected. Configurations of the signal management control units $\mathbf{47}_1$–$\mathbf{47}_n$ are the same. A detected signal of the signal management control unit $\mathbf{47}_1$ is a data signal latch clock LP applied to the terminal $CKB_1$. A detected signal of the signal management control unit $\mathbf{47}_2$ is a scan start pulse (frame start signal) SP applied to the terminal $CKB_2$. A detected signal of the signal management control unit $\mathbf{47}_n$ is an AC-transforming clock FR applied to the terminal CKBn.

Now, an emphasis is placed on the signal management control unit $\mathbf{47}_1$, and the construction thereof will be explained. The signal management control unit $\mathbf{47}_1$ includes a signal stop detection circuit 48 serving as a signal detection means for detecting stoppage of the detected signal and a sequence processing circuit 51 consisting of a signal delay circuit 49 and a logic circuit 50.

The signal stop detection circuit 48 is composed of: a first N-type MOS transistor $Tr_1$ switched by a latch clock LP conceived as a detected signal and constituting a transfer gate; an inverter $INV_1$ for inverting a phase of the latch clock LP; a second N-type MOS transistor $Tr_2$ switched by an antiphase signal of the latch clock LP and constituting a transfer gate; a first capacitor $C_{11}$ for effecting a charge and discharge in accordance with opening/closing operations of the first N-type MOS transistor $Tr_1$; a second capacitor $C_{12}$ for effecting the charge and discharge in accordance with the opening/closing operations of the second N-type MOS transistor $Tr_2$; a discharge resistor $R_1$ for discharging an electric charge of the capacitor $C_{12}$; and an inverter $INV_2$ for outputting a charge level judgment signal by comparing a charge voltage of the second capacitor $C_{12}$ with a threshold value $V_{TH}$. The first N-type MOS transistor $Tr_1$, the inverter $INV_1$ and the second N-type MOS transistor $Tr_2$ are combined to constitute a series exclusive keying circuit. The first N-type MOS constitutes a selective charge switch for the first capacitor $C_{11}$. The second N-type MOST transistor $Tr_2$ constitutes a selective charge switch for distributively transferring a charge of the first capacitor $C_{11}$ to a second capacitor $C_{12}$.

The signal delay circuit 49 consists of: a D-type flip-flop 49a, in which the frame start signal SP serves as a clock input CK, including a reset terminal R connected to an output of the inverter $INV_2$ and an input terminal D earthed; and a D-type flip-flop 49b, in which the frame start signal SP serves as a clock input, including a reset terminal R connected to the output of the inverter $INV_2$ and an input terminal D connected to an output Q of the flip-flop 49a. The logic circuit 50 is constructed of an AND circuit which receives two inputs of the forced blank signal DFF from the control circuit 10 and an output Q of a flip-flop 49b.

Figure 3:
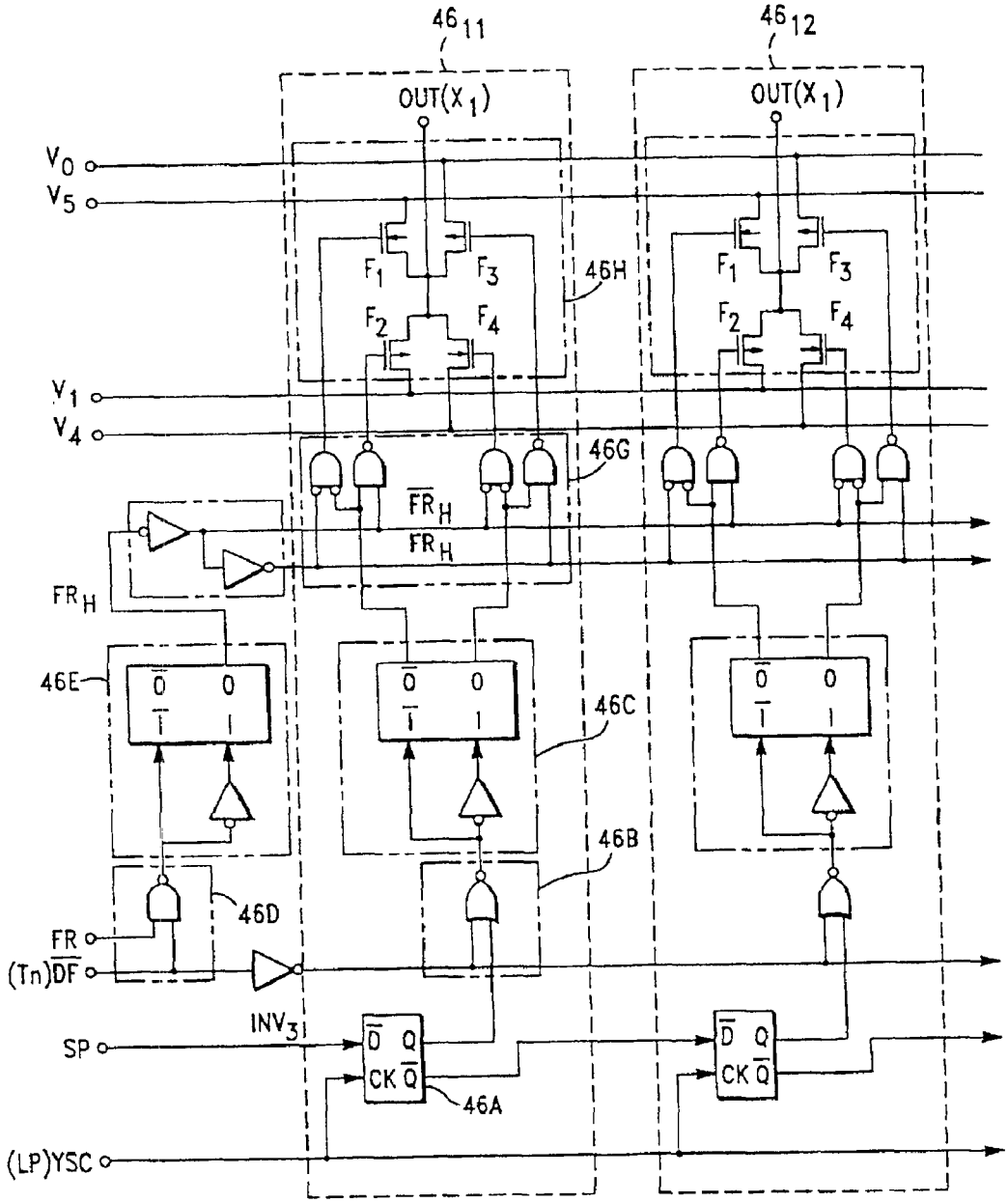
FIG. 3 is a circuit diagram illustrating scan electrode driving cells of the scan driver in the same embodiment.

FIG. 3 is a circuit diagram illustrating a typical scan electrode driving circuit (logic unit) other than the signal management control unit $\mathbf{47}_1$ of the scan driver $\mathbf{46}_1$. Formed in array in this logic unit are multi-bit scan electrode driving cells $\mathbf{46}_{11}$, $\mathbf{46}_{12}$, . . . for applying voltages in the order of lines corresponding to a multiplicity of scan electrodes. Turning to FIG. 3, there are illustrated the scan electrode driving cells $\mathbf{46}_{11}$, $\mathbf{46}_{12}$ of the first and second bits and peripheral circuits thereof.

Attention is herein paid on the scan electrode driving cell $\mathbf{46}_{11}$, and its configuration will be explained. This scan electrode driving cell $\mathbf{46}_{11}$ consists of: a D-type flip-flop 46a, in a shift register, started by the frame start signal SP and transferring this frame start signal SP to the next stage every time a scan synchronous signal YSCL comes; a line unit forced blank display control circuit 46b for performing a logic arithmetic operation by adding, to its bit selection output Q, a forced blank display signal DF supplied from the terminal $T_n$ of the n-th scan driver 46n; a line unit voltage level shift circuit 46c for converting an output thereof into a high voltage system logic amplitude from a logic system power source voltage ($V_{cc}$=5v); a total line forced blank display control circuit 46d for performing a logic arithmetic operation by adding the forced blank display signal DF to the AC-transforming clock FR; an AC-transforming clock voltage level shift circuit 46e for converting the AC-transforming clock FR into a high voltage AC-transforming clock $F_{RH}$ having a high voltage system logic amplitude from the logic system power source voltage ($V_{cc}$=5v); a positive/opposite 2-phase clock generation circuit 46f for inverting the high voltage AC-transforming clock $FR_H$ thereof to an antiphase high voltage AC-transforming clock $FR_H$; a selection control signal generation circuit 46g for generating four pieces of selection control signals $C_1$–$C_4$ in chained combinations from a pair of the high voltage AC-transforming clock $FR_H$ and the antiphase high voltage AC-transforming clock $F_{RH}$ and a pair of outputs 0, 0 of the line unit voltage level shift circuit 46c; and a selection switch 46h for alternatively convey-supplying scan electrode driving voltages $V_5$, $V_1$, $V_0$, $V_4$ to the scan electrodes in response to respective selection control signals $C_1$, $C_2$, $C_3$, $C_4$. A forced blank display control circuit is herein composed of the line unit forced blank display control circuit 46b and the total line blank display control circuit 46d. Note that the symbol $INV_3$ represents an inverter for matching logic with respect to the line unit forced blank display control circuit 46b of the forced blank display control signal DF.

Next, the operation of this embodiment will also be explained with reference to FIG. 4. When turning on a logic power source $V_{cc}$ of the liquid crystal display device at a time $t_0$, a reset signal having a pulse width of several μs—several ms is supplied to a power-on reset terminal RS of a liquid crystal module controller 12 from an MPU (not illustrated) in the same manner with the prior art. The liquid crystal module controller 12 is thereby initialized. During this initialization, a variety of signals outputted from the liquid crystal module controller 12 are generally in a stopping status. During this period, the forced blank display signal DFF assumes a low voltage level (hereinafter referred to as an L level). Hence, a liquid crystal power source circuit 28 is in a power-off state, while the liquid crystal driving power source voltages $V_0$–$V_5$ remain in a non-generated state. Therefore, during this initialization, no DC component is applied between the liquid crystal electrodes, and deterioration in liquid crystal elements is prevented.

Figure 4:
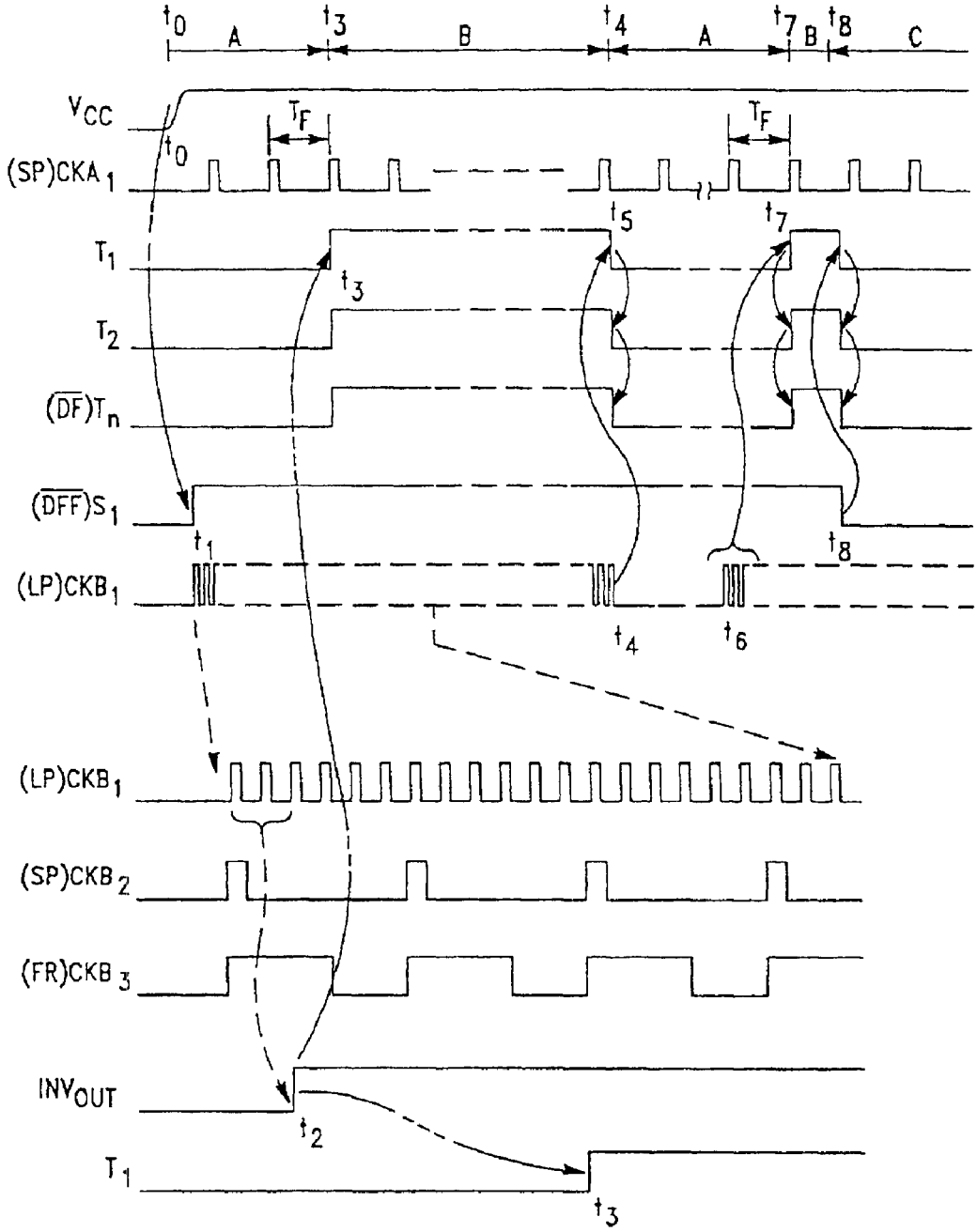
FIG. 4 is a timing chart, showing relations between a variety of signals in a liquid crystal display body module unit, of assistance in explaining the operation of the same embodiment.

If over this period, as illustrated in FIG. 4, the forced blank display signal DFF changes from the L level to a high voltage level (hereinafter referred to as an H level) at a time $t_1$, the liquid crystal module controller 12 generates the frame start signal SP, the data signal latch clock LP, and the AC-transforming clock FR. Now, the operation of the signal management control unit $\mathbf{47}_1$ of the scan driver $\mathbf{46}_1$ will first be described. The frame start signal SP is supplied to an input terminal $CKA_1$ of the signal delay circuit 49. The data latch clock LP is supplied to a detection terminal $CKB_1$ of the signal stop detection circuit 48.

During an H-level period of the data signal latch clock LP, the transistor $Tr_1$ of the signal stop detection circuit 48 assumes an on-status, whereas the transistor $Tr_2$ assumes an off-status. Hence, the capacitor $C_{11}$ is charged with electricity for this period. During an L level period of the data signal latch clock LP, the transistor $Tr_2$ of the signal stop detection circuit 48 is in the on-status, whereas the transistor $Tr_1$ is in the off-status. Therefore, a part of the electric charge supplied to the capacitor $C_{11}$ is transferred to a capacitor $C_{12}$. A charging voltage of the capacitor $C_{12}$ increases with a generation of repetitive pulses of the data signal latch clocks LP. An input voltage of the inverter $INV_2$ comes to the threshold value $V_{TH}$ or less. An output $INV_{OUT}$ of the inverter $INV_2$ assumes the H level at a time $t_2$. Before the time $t_2$, the output $INV_{OUT}$ of the inverter $INV_2$ assumes the L level. Therefore, the output Q of the D-type flip-flop 49a of the signal delay circuit 49 is at the L level. For this reason, an output $T_1$ of the logic circuit 50 assumes the L level. Even when the output $INV_{OUT}$ becomes the H level at that moment, the output Q does not assume the H level at the time $t_2$. During a 1-frame period ($T_F$) and a 2-frame period ($2T_F$) of the frame start signal SP, the output Q is kept at the L level due to delayed storage action of the input signals of the D-type flip-flops 49b, 49a. At a time $t_3$, the output $T_1$ of the logic circuit 50 assumes the H level.

The frame start signal SP is supplied to the detection terminal C K B $_2$ of the signal stop detection circuit $\mathbf{48}_2$ of the signal management control unit $\mathbf{47}_2$ Supplied to an input terminal $CKA_2$ of the signal delay circuit $\mathbf{49}_2$ is the frame start signal SP defined as a cascade input $DI_2$ coming from a cascade output terminal D0 of the scan driver $\mathbf{46}_1$. The output $T_1$ of the logic circuit 50 of the scan driver $\mathbf{46}_1$ is cascade-connected to the logic circuit 50 of the scan driver $\mathbf{46}_2$. A capacitor $C_{21}$ of the signal stop detection circuit $\mathbf{48}_2$ is fed with electric energy by repetitive pulses of the frame start signals SP. Similarly, the AC-transforming signal FR is supplied to a detection terminal CKBn of the signal stop detection circuit 48n of the signal management control unit 47n in the scan driver 46n. Supplied to an input terminal CKAn of the signal delay circuit 49n is the frame start signal SP defined as a cascade input $DI_n$ coming from the output terminal D0 of the scan driver $\mathbf{46}_2$. The output $T_2$ of the logic circuit 50 of the scan driver $\mathbf{46}_2$ is cascade-connected to the logic circuit 50 of the scan driver 46n. A capacitor $C_{n2}$ of the signal stop detection circuit 48n is charged with electricity by the repetitive pulses of the AC-transforming signals FR. The different periods and duty ratios of the data signals latch clock LP conceived as a detected signal, the frame start signal SP and the AC-transforming signal FR. For making coincident the comparative judgment times $t_3$ of the inverters $INV_1$–$INV_n$ in the respective scan drivers, it is desirable that values (time constants) of discharge resistances $R_1$–$R_n$ and of the capacitors $C_{11}$–$C_{n1}$, $C_{12}$–$C_{n2}$ be mutually adjustable. For this purpose, in this embodiment, as illustrated in FIG. 1, the scan driver is provided with external connection terminals for the resistances and the externally attached capacitors.

As described above, during a period from the on-time $t_0$ of the logic power source $V_{cc}$ to the time $t_3$ when the outputs $T_1$–$T_n$ of the logic circuit assume the H level, the L level outputs $T_n$ are supplied to the forced display blank control terminals DF of the signal drivers and the scan drivers. A liquid crystal display panel 22 is therefore in a blank display state. More specifically, when the forced display blank control signal DF is at the L level, only a transistor $F_1$ of the selection switch 46h of the scan electrode driving cell 46 remains in an on-state under control of the forced blank display control circuits 46b, 46d depicted in FIG. 3. A voltage of $V_5$ (0v) is impressed on the scan electrodes, while an inter liquid crystal electrode voltage (liquid crystal applying voltage) is 0v. A period from the time $t_0$ to the time $t_3$ corresponds to a liquid crystal drive inhibit period. At time $t_1$, the liquid crystal power source circuit 28 is powered on, whereby the liquid crystal voltages $V_0$–$V_5$ are generated. Those voltages are supplied to the scan and signal drivers. At a power source actuation time, the shift registers in the scan and signal drivers are in an unsteady state. The liquid crystal display continues to be blank-controlled up to the time $t_3$, however, it is therefore possible to avoid abnormal driving of the liquid crystal panel.

Next, when the output $T_n$ becomes the H level at the time $t_3$, H-level voltages are supplied to the forced display blank control terminals DF of the scan and signal drivers. The liquid crystal display panel 22 is thereby AC-driven by normal operations of the scan and signal drivers. A display picture is depicted on the liquid crystal panel 22. The symbol B of FIG. 4 indicates a liquid crystal driving period. The liquid power source circuit 28 and the logic units of the scan and signal drivers are powered on at the time $t_1$. At time $t_3$ later than that time, the liquid crystal display panel 22 is driven. Therefore, since the power-on of the power source does not take place simultaneously, an excessive power source rush current is restrained. It is because, in addition to delayed action of the signal stop detection circuit 48 itself, the delayed action of the signal delay circuit 49 having a delay time of 1–2 frame periods functions effectively.

Now, it is presumed that an output of the data signal latch clock LP transmitted from the liquid crystal module controller 12 is stopped at a time $t_4$ in the liquid crystal driving period B. During outputting of the data signal latch clock LP, sufficient electric energy is supplied to the second capacitor $C_{12}$ of the signal detection circuit $\mathbf{48}_1$ of the scan driver $\mathbf{46}_1$. When the clock thereof is stopped, no electric charge is transferred to the second capacitor $C_{12}$ from the first capacitor $C_{11}$. Besides, the electric charge of the second capacitor $C_{12}$ is quickly discharged at a predetermined time constant via the discharge resistance $R_1$. An input voltage of the inverter $INV_2$ is gradually boosted. If that input voltage exceeds the threshold value $V_{TH}$, the output voltage $INV_{OUT}$ thereof assumes the L level at a time $t_5$. With this logic variation, the signal delay circuit $\mathbf{49}_1$ is reset, and the output Q thereof becomes the L level. Hence, in spite of the fact that the forced display blank control signal DF is at the L level, the output $T_1$ of the logic circuit $\mathbf{50}_1$ assumes the L level at the time $t_5$. This $T_1$ output is cascade-inputted to the logic circuit $\mathbf{50}_2$ of the scan driver $\mathbf{46}_2$. Even when the frame start signal SP is being outputted, and output $T_2$ of the logic circuit $\mathbf{50}_2$ becomes the L level. Further, the $T_2$ output is cascade-inputted to the logic circuit $\mathbf{50}_n$ of the scan driver 46n. Therefore, the output $T_n$ of the logic circuit $\mathbf{50}_n$ assumes the L level even when the AC-transforming signal FR is being outputted. The output $T_n$ thereof corresponds to the forced display blank control signal DF on the side of the liquid crystal display module unit 46. The liquid crystal panel 22 is thereby brought into a blank display state by using the forced display blank circuits 46b, 46d. Namely, only a transistor $F_1$ of the selection switch 46h of the scan electrode driving cell 46 shown in FIG. 3 is in the on-state. A voltage $V_5$ (0v) is fed to the scan electrodes, and the inter liquid crystal electrode voltage is thereby kept at 0v. For this reason, even if the data signal latch clock LP is stopped due to some cause, the liquid crystal elements are not driven by the DC components, thereby preventing deterioration of the liquid crystal beforehand. If the frame start signal SP or the AC-transforming signal FR is stopped due to some cause, the output $T_n$ becomes the L level. Similarly, the deterioration of the liquid crystal is prevented beforehand. Incidentally, during this liquid crystal drive inhibit period A, so far as the frame start signal SP and the AC-transforming signal FR continue, the second capacitor $C_{22}$ and the capacitor $C_{n1}$ are in a charged state; and the outputs of the inverters $INV_2$, $INV_n$ assume the H level.

When the data signal latch clock LP begins to reappear at a time $t_6$, as described above, the second capacitor $C_{12}$ is charged with electricity. The output $INV_{OUT}$ of the inverter $INV_1$ then becomes the H level. After 1–2 frame periods from the time when the output $INV_{OUT}$ has become the H level, the output Q of the signal delay circuit $\mathbf{49}_1$ functioning as a timer assumes the H level at a time $t_7$. The output $T_1$ of the logic circuit $\mathbf{50}_1$ thereby becomes the H level, and correspondingly the outputs $T_2$, $T_n$ of the logic circuits $\mathbf{50}_2$, $\mathbf{50}_n$ become the H level. Hence, the forced blank control signal DF on the part of the liquid crystal module unit 22 is changed to the H level, whereby the liquid crystal display panel 22 enters the liquid crystal driving period B.

Finally, when the forced display blank control signal DFF on the part of the liquid crystal display controller 12 assumes the L level at a time $t_8$, the output $T_1$ of the logic circuit $\mathbf{50}_1$ is changed to the L level. The outputs $T_2$, $T_n$ of the logic circuits $\mathbf{50}_2$, $\mathbf{50}_n$ thereby become the L level. Therefore, the forced display blank control signal DF on the side of the liquid crystal display module unit 20 becomes the L level. The liquid crystal display panel 22 enters a display-off period C.

(Embodiment 2)

Figure 5:
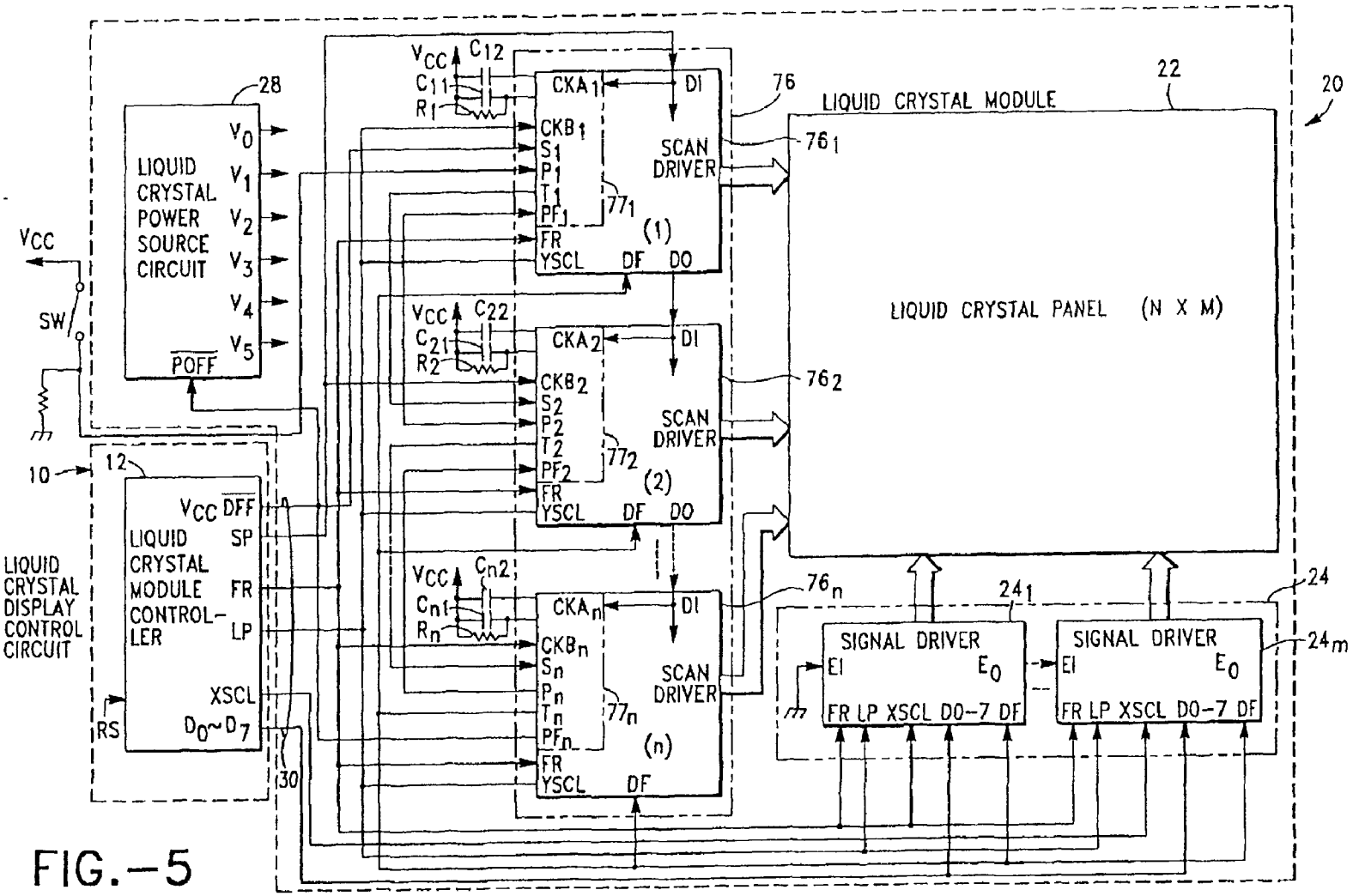
FIG. 5 is a block diagram depicting a whole configuration of the liquid crystal display device in an embodiment 2 of this invention.

FIG. 5 is a block diagram illustrating the liquid crystal display device in an embodiment 2 of this invention. Note that in FIG. 5, the same components as those of FIG. 1 are marked with like reference symbols, and the description thereof will be omitted.

Figure 6:
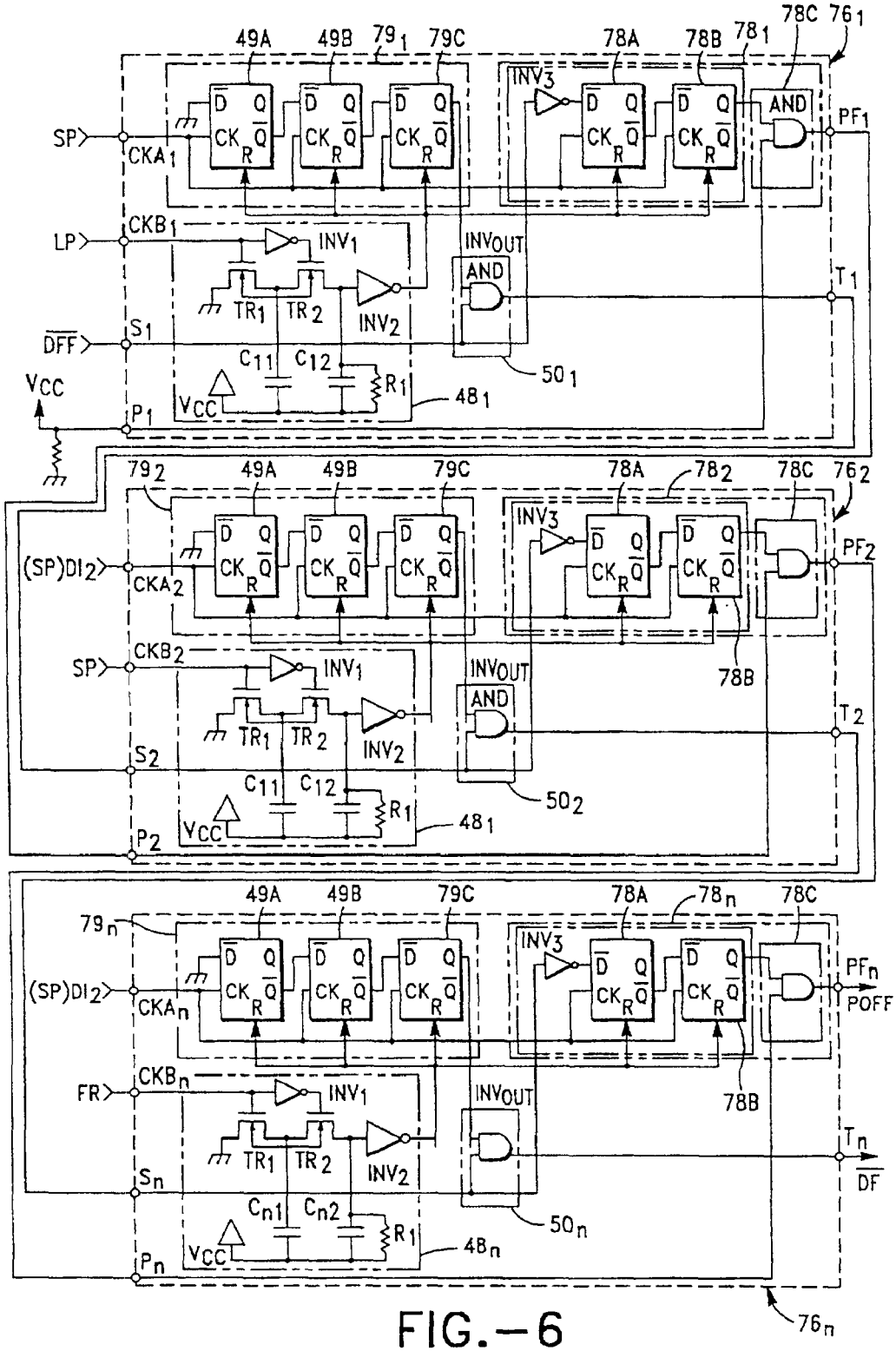
FIG. 6 is a circuit diagram showing constructions of the signal management control units of the respective scan drivers and connective relations between the drivers in the same embodiment.

A scan electrode driving circuit (X drivers) of a liquid crystal display module unit 70 is composed of a plurality of scan drivers $\mathbf{76}_1$–$\mathbf{76}_n$. These scan drivers include signal management control units $\mathbf{77}_1$–$\mathbf{77}_n$ identical with the signal management control units of the embodiment 1. Added to the respective signal management control unit $\mathbf{77}_1$–$\mathbf{77}_n$, as illustrated in FIG. 6, are power source power on/off control circuits $\mathbf{78}_1$–$\mathbf{78}_n$ for controlling power on/off times of the liquid crystal power source circuit 28 for generating the liquid crystal driving voltages $V_0$–$V_5$. Each of the power source power on/off control circuits $\mathbf{78}_1$–$\mathbf{78}_n$ is constructed of: an inverter $INV_3$ for inverting signals coming in input terminals $S_1$–$S_n$ of the logic circuit $\mathbf{50}_n$; 2-stage-connected D-type flip-flops 78a, 78b; and a logic circuit 78c for taking logic with respect to the signals coming from terminals $P_1$–$P_n$ and the output Q. A signal delay circuit 79 of each signal management control unit 77 is constructed in such a way that a D-type flip-flop 79c of the third stage is additionally connected to the 2-stage-connected D-type flip-flops 49a, 49b of the signal delay circuit 49 in the embodiment 1. A power on/off signal of the power source voltage $V_{cc}$ on the logic side is supplied to an input terminal $P_1$ of a logic circuit 78c of the first scan driver $\mathbf{76}_1$. An output $PF_1$ of the power source power on/off control circuit $\mathbf{78}_1$ in the first scan driver $\mathbf{76}_1$ is cascade-supplied to a terminal $P_2$ of the second scan driver $\mathbf{76}_2$. An output $PF_2$ of the power source power on/off control circuit $\mathbf{78}_2$ in the second scan driver $\mathbf{76}_2$ of the previous stage, is cascade-supplied to a terminal $P_n$ of the n-th scan driver $\mathbf{76}_n$. An output $PF_n$ of the power source power on/off control circuit 78n of the n-th scan driver 76n is supplied to a power-off terminal POFF of the liquid crystal power source circuit 28.

Figure 7:
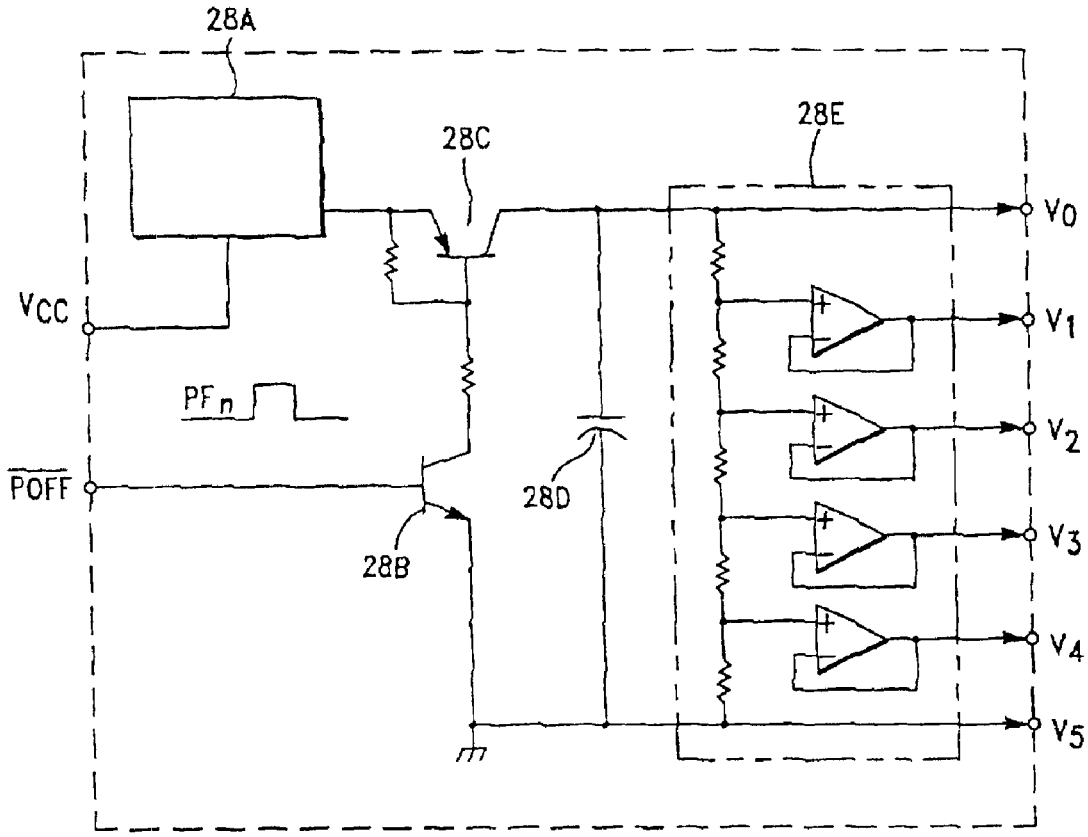
FIG.—7 (PRIOR ART)
FIG. 7 is a circuit diagram illustrating construction of a liquid crystal power source circuit in the same embodiment.

The liquid crystal power source circuit 28 is structured in the same way with the conventional example. This circuit, as depicted in FIG. 7, includes: a voltage transforming circuit 28a for generating a high voltage (20–40v) which is boosted based on the $V_{cc}$ (5v) power source voltage; an npn-type transistor 28b for effecting on/off control depending on a value of the voltage supplied to the power-off terminal POFF; a pnp-type transistor 28c of a power switch for performing on/off operations interlocking with on/off operations of the transistor 28b; a smoothing capacitor 28d interposed between a collector thereof and the earth; and a voltage dividing circuit 28e for outputting the liquid crystal driving voltages $V_0$–$V_5$ from the charge voltage thereof.

The operation of the foregoing embodiment will next be explained with reference to FIG. 8. A power switch SW is closed at a time $t_0$. The logic power source $V_{cc}$ of the liquid crystal display device is turned on. In the same manner as embodiment 1, a reset signal having a pulse width of several μs—several ms is supplied from an MPU to a power-on reset terminal RS of the liquid crystal module controller 12. The liquid crystal module controller 12 is thereby initialized. Hence, an output signal from the liquid crystal module controller 12 is generally in a stopping status. During such a period, the logic power source voltage $V_{cc}$ is supplied to one input of the logic circuit 78c defined as an AND circuit of the first scan driver $\mathbf{76}_1$. The data signal latch clock LP does not yet, however, come out, and hence its output $PF_1$ assumes the L level. As a result, an output $PF_2$ of the second scan driver $\mathbf{76}_2$ is also at the L level. Besides, an output $PE_n$ of the n-th scan driver $\mathbf{76}_n$ also becomes the L level, whereby a power-off terminal POFF of the liquid crystal power source circuit 28 is kept at the L level. For this reason, a base potential of the transistor 28b shown in FIG. 7 assumes an L level (0v), so that a boosted voltage is not supplied to the smoothing capacitor 28d. Therefore, the liquid crystal driving voltages $V_0$–$V_5$ are not generated. As is similar to embodiment 1, no DC component is applied between the liquid crystal electrodes during this initializing period. Deterioration of the liquid crystal elements is prevented.

Figure 8:
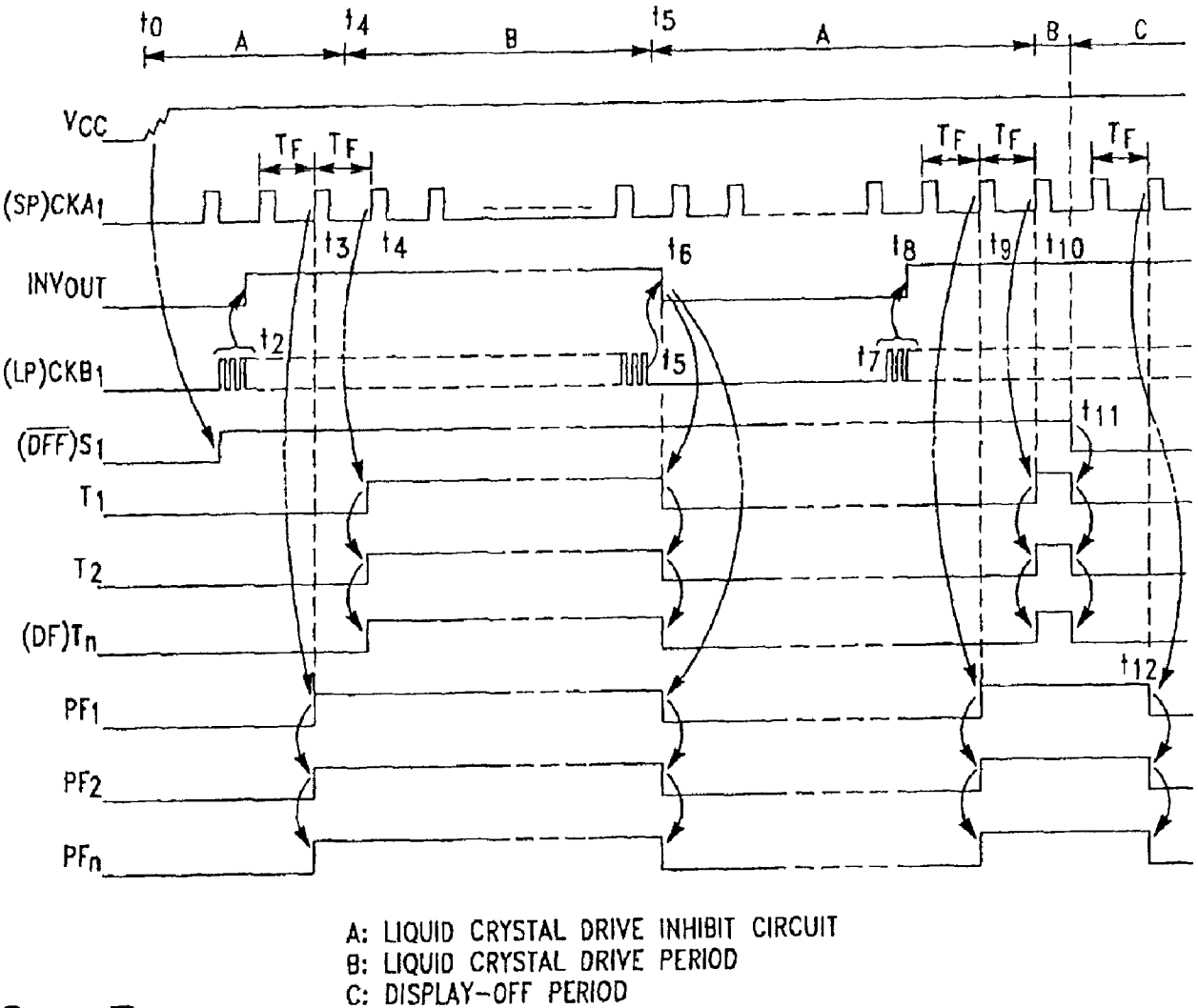
FIG. 8 is a timing chart, showing relations of a variety of signals in the liquid crystal display body module unit, of assistance in explaining the operation of the same embodiment.

Next, as illustrated in FIG. 8, a variety of signals are generated from the liquid crystal module controller 12 at a time $t_1$. The forced blank display signal DFF is changed from the L level to the H level. The frame start signal SP, the data signal latch clock LP, and the AC-transforming clock FR are generated. As explained in embodiment 1, upon the data signal latch clock LP starting to appear, the output $INV_{OUT}$ of the inverter $INV_2$ assumes the H level at a time $t_2$. For this reason, the output Q of the power on/off control circuit 78b becomes the H level at a time $t_3$ which is later by a 1–2 frame period than the time $t_2$. The output $PF_1$ of the logic circuit 78c, therefore, becomes the H level. The outputs $PF_2$, PFn of the logic circuits 78c of the second and n-th scan drivers $\mathbf{76}_2$, $\mathbf{76}_n$ become the H level, correspondingly. The power-off terminal POFF of the liquid crystal power source circuit 28 is energized at the H level. In consequence of this, the transistor 28b is put into an on-state. The transistor 28c is also brought into the on-state because of a drop in voltage of an inter base/emitter resistance of the transistor 28c. The smoothing capacitor 28d is charged with electricity, thereby generating the liquid crystal driving voltages $V_0$–$V_5$. During a period from the time $t_3$ to a time $t_4$ when the next frame start signal SP arrives, the output Q of the D-type flip-flop 79c remains at the L level. The stage number of the D-type flip-flops of the signal delay circuit $\mathbf{79}_1$ in this embodiment is greater by 1 than in the power on/off control circuit $\mathbf{78}_1$. The output Q of the D-type flip-flop 79c becomes the H level, but slower by a 1-frame period $T_F$ than that of the D-type flip-flop 78b. As a result, the outputs $T_{11}$, $T_{27}$, Tn all become the H level. In the same manner as embodiment 1, the forced blank display signal DF on the part of the liquid crystal module unit is changed from the L level to the H level. The driving voltages $V_0$–$V_5$ are thereby supplied to the scan and signal electrodes of the liquid crystal display panel 22. The operation then enters a liquid crystal mode.

For instance, concurrently with generation of the liquid crystal driving voltages $V_0$–$V_5$, the liquid crystal display panel 22 is driven. It follows that large charge rush currents are induced in power source units of the scan and signal drivers as well as in the liquid crystal panel. In accordance with this embodiment, however, the liquid crystal drive is initiated after the 1-frame period $T_F$ since the liquid crystal driving voltages $V_0$–$V_5$ have been generated at the time $t_3$. The power source units are energized with a time difference, whereby the rush currents can be dispersed. This makes it possible to prevent a power-down and reduce power capacity, which is in turn helpful for protecting the liquid crystal display panel and the drivers as well. The above-described power control decreases burden in terms of system development costs and restrains an increase in the number of signal wires between the conventional system and LCD module. Furthermore, a reduction in power capacity is brought about, and hence inexpensive power source is available.

Next, supposing that oscillations of the data signal latch clocks LP transmitted from the liquid crystal module controller 12 are stopped at the time $t_5$ in the liquid crystal driving period B, as in embodiment 1, the input voltage of the inverter $INV_2$ is boosted. The output voltage $INV_{OUT}$ becomes the L level at a time $t_6$. The outputs $T_1$, $T_2$, $T_n$ also become the L level. As a result, the forced display blank control signal DF on the side of the liquid crystal display module unit assumes the L level. The liquid crystal display panel 22 is thereby put into a blank display state. The effects as those of embodiment 1 are exhibited. When the output voltage $INV_{OUT}$ of the inverter $INV_2$ assumes the L level, the outputs $PF_1$, $PF_2$, $PF_n$ simultaneously become the L level. The power-off terminal POFF of the liquid crystal power source circuit 28 is changed to the L level. The liquid crystal driving voltages $V_0$–$V_5$ cease to be generated.

The data signal latch clock LP starts reappearing at a time $t_7$. In the same manner as embodiment 1, the output voltage $INV_{OUT}$ of the inverter $INV_2$ becomes the H level at a time $t_8$. As discussed above, the outputs $PF_{11}$, $PF_2$, $PF_n$ also become the H level at a time $t_9$ after a 1–2 frame period from time $t_8$. In consequence of this, the power-off terminal POFF of liquid crystal power source circuit 28 is changed to the H level. The liquid crystal driving voltages $V_0$–$V_5$ which are in turn applied to the drivers are generated. As explained earlier, the outputs $T_1$, $T_2$, $T_n$ become the H level at a time $t_{10}$ which is later by 1-frame period, $T_F$, than the time $t_9$. The liquid crystal driving voltages $V_0$–$V_5$ are supplied to the scan and signal electrodes of the liquid crystal display panel 22. Then the liquid crystal resumes display mode.

When the forced display blank control signal DFF on the part of the liquid crystal display controller 12 becomes the L level at a time $t_{11}$, the outputs $T_1$, $T_2$, $T_n$ also become the L level. Correspondingly, the forced display blank control signal DF on the side of the liquid display module unit 70 assumes the L level. The liquid crystal display panel 22 enters a display-off period C. At a time $t_{12}$ after a 1–2 frame period from time $t_{11}$, the output Q of the D-type flip-flop 78b of the power on/off control circuit $\mathbf{78}_1$ is changed to the L level. The outputs $PF_1$, $PF_2$, $PF_n$ also become the L level. As a result, the power-off terminal POFF of the liquid crystal power source circuit 28 also assumes the L level. Then the generation of the liquid crystal driving voltages $V_0$–$V_5$ stops. As described above, the forced display blank control signal DE on the side of the liquid crystal display controller 12 becomes the L level, after stopping the liquid crystal drive, and after a constant period has elapsed, no voltage is applied to the liquid crystal drivers. Relations in potential with respect to the logic power source $V_{cc}$ and the liquid crystal driving voltages $V_0$–$V_5$ are maintained by the sequence during such a power-off period. A through current and a parasitic bipolar current within the driver are restrained, thereby protecting the liquid crystal display panel and the drivers as well.

In accordance with this embodiment, after the clocks have been supplied to the liquid crystal module, the liquid crystal power source circuit 28 is powered on. The liquid crystal power source circuit 28 is powered off when stopping the output of the clocks. Rush currents become dispersive or occur with a time difference by the auto-sequence of such energizing of the power source. As is similar to the above, it is feasible to protect the liquid crystal panel constituting the liquid crystal display module, the drivers, and the liquid crystal power source circuit as well.

Incidentally, in the embodiments discussed above, the signal management control units are incorporated into the scan drivers LSI. It is because the number of the I/O signal lines is smaller than that of the signal drivers LSI, and the display frame region is broad. Hence, an allowance for the area of the circuit board mounted with the signal management control units is large. This embodiment has dealt with the display device based on a simple matrix liquid crystal panel. The present invention is not limited to this type of display device but may be applied to an active matrix type liquid crystal display device. In such a case, it is desirable that the signal management control units be incorporated into gate drivers LSI. On this occasion, the gate drivers LSI are controlled so that all the gates are turned on when stopping the clocks. Source drivers are controlled to output the same potential on the data side as that on the common side. All the pixel electric fields are set in a non-application state. Besides, the present invention is applicable not only to the displays but also to display devices whose display quality is deteriorated by the DC drive as can be seen in an electronic device and a plasma display to which the liquid crystal device is, as in the case of a liquid crystal photo arithmetic device, widely applied.

In the respective embodiments discussed above, the liquid crystal module incorporates a means for detecting an abnormality in the signal supplied from the liquid crystal module controller 12 and a means for eliminating this abnormal state of the signal beforehand or afterwards. The following distributive arrangement may, however, be adoptable. Some of components of those means are provided in the liquid crystal module, while the rest of them are provided in the system (controller). For example, the plurality of signals (SP, LP, FR) which may cause a DC driver of the liquid crystal panel are different from each other in terms of frequencies and pulse duties. Therefore, those signals are converted into a single composite signal by use of a non-coincidence gate (Exclusive OR gate). The composite signal is sent back to the system, and the abnormal state is checked by a judgment circuit. The abnormal state is eliminated by an output thereof. An additional arrangement is that the indicator display is effected by using a display body other than that on the side of the LCD module. The following is another adoptable method. The output of the terminal $T_n$ of the scan driver $\mathbf{46}_n$ in the embodiment of FIG. 1 is returned to the system, and the logic and liquid crystal system power sources, are on/off-controlled by fixed procedures (sequence).

Another cause for deteriorating the liquid crystal panel will be elucidated. The deterioration may be caused by the fact that the liquid crystal panel is driven by the effective DC components due to a decay in the output of a specific driver. Deterioration may also be caused by value shifts of the liquid crystal driving voltages $V_0$–$V_5$ which are derived from an abnormality in the voltage dividing circuit 28e of the liquid crystal power source circuit 28 shown in FIG. 7. Those abnormal conditions are detectable as fluctuations in the power source current and voltage and, therefore, eliminated by the above-described abnormality eliminating means.

Industrial Applicability:

As discussed above, in a flat display device according to the present invention, when stopping the oscillations of signals transferred from the display control unit, the DC drive of the liquid crystal is forcibly stopped by the signal management control means of the display body module. It is, therefore, possible to prevent deterioration in the display body which is derived from the DC drive. Besides, power source rush currents can be reduced. The present invention is applicable not only to the liquid crystal display device but also to a plasma display device and the like. The present invention is suitable for use with such display devices that the display quality and life-span of the display body are unrestorable due to the abnormality in the driving signals.

What is claimed is:

[1. A method of controlling a flat display unit comprising a flat display panel driven in accordance with display driving voltages, display driver means for selecting the display driving voltages supplied to the flat display panel and a display power source circuit for supplying the display driving voltages to the display driver means in response to a power control signal, the method of controlling the flat display unit comprising the steps of:

detecting a logic power voltage activating a logic circuit of the flat display unit by the display driver means;

supplying the power control signal from the display driver means to the power source circuit, said power control signal having a delay time after the detection of said logic power voltage;

supplying the display driving voltages to the display driver means in response to the power control signal by the power source circuit; and selecting the display driving voltages supplied from the power source circuit to the flat display panel by the display driver means.]

[2. The method according to claim 1, further comprising the step of supplying a start signal controlling a start of display to the display driver means after supplying the display driving voltages to the display driver means.]

[3. A method of controlling a flat display device comprising a flat display panel module unit and a display control unit for supplying control signals to control display of the flat display panel module unit, said flat display panel module unit including a flat display panel driven in accordance with display driving voltages, display driver means for selecting the display driving voltages to the flat display panel and a display power source circuit for supplying the display driving voltages to the display driver means in response to a power control signal, the method of controlling the flat display unit comprising the steps of:

supplying the power control signal to the power source circuit by the display driver means, the power control signal having a delay time after a logic power voltage has been supplied to a logic circuit of the flat display device;

supplying the display driving voltages to the display driver means in response to the power control signal by the power source circuit;

supplying a display start signal controlling a start of the selection of the display driving voltages by the display driver means in response to the control signal supplied from the display control unit, said display start signal having a delay time after the power control signal has supplied to the power source circuit; and selecting the display driving voltages supplied from the power source circuit to supply to the flat display panel in response to the display start signal.]

[4. The method according to claim 3, wherein the flat display panel module unit is arranged separately from the display control unit.]

[5. A flat display unit comprising:

a flat display panel for being driven in accordance with display driving voltages;

display driver means for selecting the display driving voltages supplied to said flat display panel, said display driver means comprising a logic circuit and a detection means for detecting a logic power voltage, activating said logic circuit and for supplying a power control signal having a delay time after the detection of the logic power voltage; and a display power source circuit for supplying the display driving voltages to said display driver means in response to the power control signal.]

[6. A flat display device comprising a flat display panel module unit and a display control unit for supplying control signals to control display of the flat display panel module unit, said flat display panel module unit comprising:

a flat display panel driven in accordance with display driving voltages;

display driver means for selecting the display driving voltages supplied to said flat display panel and for supplying a power control signal having a delay time after a logic power voltage has been supplied to a logic circuit of said display driver means; and a display power source circuit for supplying the display driving voltages to said display driving means in response to the power control signal, wherein said display driver means starts the selection of the display driving voltages in response to a display start signal having a delay time after the power control signal has supplied to said power source circuit.]

*7. A method of controlling a display apparatus comprising a display control device, a display device that is driven by a display driving voltage, a display device driver unit that selects the display driving voltage that is to be supplied to the display device, and a display device power supply that supplies the display driving voltage to the display device driver unit in response to a power control signal, the method comprising:*

*a first step of supplying a logic power source voltage to the display control device;*

*a second step of supplying a forced blank display signal to the display device driver unit;*

*a third step of supplying the power control signal to control power-on of the display device power supply;*

*a fourth step of supplying the display driving voltage to the display device driver unit from the display device power supply in response to the power control signal;*

*a fifth step of supplying to the display device driver unit a start signal to control start of causing a display on the display device; and*

*a sixth step of selecting by the display device driver the display driving voltage that is supplied to the display device;*

*wherein the method advances to the third step after at least a first delay time has elapsed following the second step.*

*8. A display control device that controls a display power source circuit (28) that supplies display driving voltages to a display device (22) to show a display, comprising:*

*a display controller (12) that is responsive to the supply of a logic power source voltage (Vcc) to output a forced blank display signal (/DFF) as active (t0), and to output the forced blank display signal (/DFF) as non-active after the elapse of a first delay time (t1) subsequent to the supply of the logic power source voltage; and*

*a display device driving circuit (76) that receives the forced blank display signal and display data and drives the display device in response to the received forced blank display signal and display data, the display device driving circuit selecting and supplying to the display device a potential (V5) for presenting a blank display in response to the forced blank display signal (/DFF) being active, and*

*then, after a second delay time has elapsed (t3) following the blank display signal having turned from active to non-active (t1), the display device driving circuit outputs a display power supply control signal (/POFF) that initiates the display power supply circuit (28) to start power supply output, and*

*then, after the elapse of a third delay time (t4) following the output of the display power supply control signal (/POFF), the display device driving circuit selects and supplies to the display device predetermined display driving voltages that are output by the display power source circuit based on display data.*

* * * * *